（12) United States Patent
Davis

US012012360B2

(10) Patent No.: US 12,012,360 B2
(45) Date of Patent: Jun. 18, 2024

(54) ATHERMAL GLASSES AND ATHERMAL SYSTEMS FOR INFRARED OPTICS

(71) Applicant: SCHOTT CORPORATION, Elmsford, NY (US)

(72) Inventor: Mark J. Davis, Clarks Summitt, PA (US)

(73) Assignee: SCHOTT CORPORATION, Elmsford, NY (US)

( * ) Notice: Subject to any disclaimer, the term of this patent is extended or adjusted under 35 U.S.C. 154(b) by 853 days.

(21) Appl. No.: 16/898,985

(22) Filed: Jun. 11, 2020

(65) Prior Publication Data

US 2020/0299182 A1 Sep. 24, 2020

Related U.S. Application Data

(63) Continuation of application No. PCT/US2018/064873, filed on Dec. 11, 2018.

(60) Provisional application No. 62/596,932, filed on Dec. 11, 2017.

(51) Int. Cl.
| | |
|---|---|
| C03C 3/32 | (2006.01) |
| C03C 13/04 | (2006.01) |
| G01L 1/24 | (2006.01) |
| G02B 6/02 | (2006.01) |
| H01S 3/17 | (2006.01) |

(52) U.S. Cl.
CPC .......... *C03C 3/321* (2013.01); *C03C 13/048* (2013.01); *G01L 1/242* (2013.01); *G02B 6/0219* (2013.01); *H01S 3/171* (2013.01); *C03C 2213/00* (2013.01)

(58) Field of Classification Search
CPC ...................................................... C03C 3/321
See application file for complete search history.

(56) References Cited

U.S. PATENT DOCUMENTS

| | | | | |
|---|---|---|---|---|
| 2,883,293 | A * | 4/1959 | Jerger, Jr. ............... | C03C 3/321 |
| | | | | 501/40 |
| 2,883,294 | A * | 4/1959 | Jerger, Jr. ............... | C03C 3/321 |
| | | | | 501/40 |
| 2,961,350 | A * | 11/1960 | Flaschen ............... | H01L 21/314 |
| | | | | 174/251 |
| 3,033,693 | A * | 5/1962 | Carnall, Jr. ............ | C03C 3/321 |
| | | | | 501/40 |
| 5,278,107 | A | 1/1994 | Tick | |
| 6,074,968 | A | 6/2000 | Yoneda | |
| 2002/0141700 | A1 * | 10/2002 | Lachance ............. | G02B 6/0218 |
| | | | | 385/99 |
| 2003/0197921 | A1 | 10/2003 | Jiang | |
| 2004/0001258 | A1 | 1/2004 | Singh | |
| 2005/0111805 | A1 * | 5/2005 | Hertz ................ | G02B 6/02357 |
| | | | | 385/125 |
| 2005/0274145 | A1 | 12/2005 | Aitken | |
| 2006/0153490 | A1 | 7/2006 | Araujo | |
| 2008/0269044 | A1 | 10/2008 | Zhao | |
| 2013/0278999 | A1 | 10/2013 | Carlie | |
| 2019/0056249 | A1 * | 2/2019 | Artuso ................ | C03B 37/0253 |

FOREIGN PATENT DOCUMENTS

| | | |
|---|---|---|
| EP | 1184943 | 3/2002 |
| EP | 2259037 | 12/2010 |
| JP | 2012225962 | 11/2012 |
| WO | 2014013240 | 1/2014 |
| WO | 2016026481 | 2/2016 |

OTHER PUBLICATIONS

Davis, "Athermal glass for infrared optics", Proceedings of SPIE; [Proceedings of SPIE; ISSN 0277-786X; vol. 8615], SPIE, 1000 20th St. Bellingham WA 98225-6705 USA, vol. 10745, Sep. 17, 2018 (Sep. 17, 2018), pp. 107450D-107450D, XP060111813, DOI: 10.1117/12.2320708.
International Search Report dated May 1, 2019 corresponding to International Patent Application No. PCT/US2018/064873, 4 pages.
Written Opinion dated May 1, 2019 corresponding to International Patent Application No. PCT/US2018/064873, 4 pages.
Jamieson, T.H., Thermal effects in optical systems, Optical Engineering, 20 (2), pp. 156-160, 1981.
Schuster, N., Passive athermalization of doublets in 8-13 micron waveband, Proceedings of SPIE—The International Society for Optical Engineering, vol. 9249, 2014, 10 pages.
Ramakrishnan, M., G. Rajan, Y. Semenova, and G. Farrell, Overview of fiber optic sensor technologies for strain/temperature sensing applications in composite materials, Sensors (Switzerland), 16 (1), 2016, 27 Pages.
Calvez, L., Chalcogenide glasses and glass-ceramics: Transparent materials in the infrared for dual applications, Comptes Rendus Physique, 18 (5-6), pp. 314-322, 2017.
Kersey, A.D., M.A. Davis, H.J. Patrick, M. LeBlanc, K.P. Koo, C.G. Askins, M.A. Putnam, and E.J. Friebele, Fiber grating sensors, Journal Of Lightwave Technology, 15 (8), pp. 1442-1462, 1997.
International Preliminary Report on Patentability dated Jun. 16, 2020 corresponding to International Patent Application No. PCT/US2018/064873, 5 pages.
Tamagawa, "Multilens system design with an athermal chart", Applied Optics, vol. 33, No. 34, Dec. 1, 1994, pp. 8009-8013.
Koechner, "Solid-State Laser Engineering", edited by W.T. Rhodes, 6 Ed., Springer, New York, 2006, 49 pages.
Hecht, "Optics", 4 Ed., Addison Wesley, San Francisco, 2002, 5 pages.
Lim, "Achromatic and athermal lens design by redistributing the element powers on an athermal glass map", Optics Express, vol. 24, No. 16, Aug. 8, 2016, pp. 18049-18058.
Reitmayer, "Effect of temperature gradients on the wave aberration in athermal optical glasses", Applied Optics, vol. 14, No. 3, Mar. 1975, pp. 716-720.

(Continued)

*Primary Examiner* — Elizabeth A. Bolden
(74) *Attorney, Agent, or Firm* — Ruggiero McAllister & McMahon LLC

(57) ABSTRACT

Athermal glasses and athermal systems for infrared optical components and systems are disclosed.

5 Claims, 6 Drawing Sheets

(56) References Cited

OTHER PUBLICATIONS

Schwertz, "Graphically selecting optical components and housing material for color correction and passive athermalization", Proc. of SPIE, vol. 8486, Oct. 11, 2012, 19 pages.
Flaschen, "Low-melting inorganic glasses with high melt fluidities below 400° C.", Journal Of The American Ceramic Society, vol. 42 (9), p. 450, 1959.

* cited by examiner

ATHERMAL GLASSES AND ATHERMAL SYSTEMS FOR INFRARED OPTICS

BACKGROUND OF THE DISCLOSURE

1. Field of the Disclosure

The present disclosure relates to athermal glasses and athermal systems for infrared optical components and systems.

2. Description of the Related Art

The ability of an optical component or system to preserve its performance while undergoing temperature changes is an important consideration to the optical designer (Jamieson, T. H., Thermal effects in optical systems, *Optical Engineering*, 20 (2), 156-160, 1981).

SUMMARY OF THE DISCLOSURE

The present disclosure describes athermal glasses and athermal systems for infrared optical components and systems. In some embodiments, the optical component or system is a solid etalon, (which can be used for example as an athermal wavelength reference filter), an optical fiber-based strain sensor, a laser gain medium in either bulk or optical fiber form, an optical fiber such as a photonic crystal fiber, or an optical lens system.

The disclosure includes a system comprising an etalon or a fiber-based strain sensor comprising a glass composition, wherein the glass composition has a figure-of-merit (FOM) with an absolute value that varies by 5 ppm/° C. or less, wherein the FOM is calculated as $$FOM = \alpha + \frac{1}{n}\frac{dn_{abs}}{dT}.$$

The system can be an etalon or a fiber-based strain sensor. The glass composition can be a chalcogenide glass composition. The chalcogenide glass composition can be represented by the formula $y$ As+(100−$y$)[$x$ S+(100−$x$)Se]

wherein 10≤$y$≤40, and 0≤$x$≤100. The chalcogenide glass composition can be represented by the formula ($x$)As$_{11}$Se$_{89}$+(1−$x$)As$_{26}$S$_{74}$ at a temperature of 25-30° C. and a wavelength of 1.5 microns, where x ranges from 0 to 1 and the tolerance on composition is +/−5 mol %. The absolute value can vary by 1 ppm/° C. or less.

The disclosure includes a system comprising a laser gain media comprising a chalcogenide glass composition, wherein the glass composition has a figure-of-merit (FOM) with an absolute value that varies by 5 ppm/° C. or less, wherein for the laser gain media the FOM is calculated as $$FOM = \alpha + \frac{1}{n}\frac{dn_{abs}}{dT}.$$

There can be a laser gain media. The chalcogenide glass composition can be represented by the formula $y$ As+(100−$y$)[$x$ S+(100−$x$)Se]

wherein 10≤$y$≤40, and 0≤$x$≤100. The chalcogenide glass composition can be represented by the formula ($x$)As$_{22}$Se$_{78}$+(1−$x$)As$_{33}$S$_{67}$ at a temperature of 25-30° C. and a wavelength of 1.5 microns, where x ranges from 0 to 1 and the tolerance on composition is +/−5 mol %. The absolute value can vary by 1 ppm/° C. or less.

The disclosure includes an optical lens system having one or more lenses, wherein at least one of the lenses comprises a chalcogenide glass composition having a negative figure-of-merit (FOM)≥30 ppm/° C., wherein the FOM is calculated as $$FOM = \left(\frac{1}{n_g - n_m}\right)\left[\frac{dn_g}{dT} - \frac{n_g}{n_m}\frac{dn_m}{dT}\right] - \alpha.$$

The chalcogenide glass composition can be represented by the formula $y$ As+(100−$y$)[$x$ S+(100−$x$)Se]

wherein 10≤$y$≤40, and 0≤$x$≤100. In some embodiments, 10≤$y$≤30, and 0≤$x$≤100.

DETAILED DESCRIPTION OF THE DISCLOSURE

Figure 1:
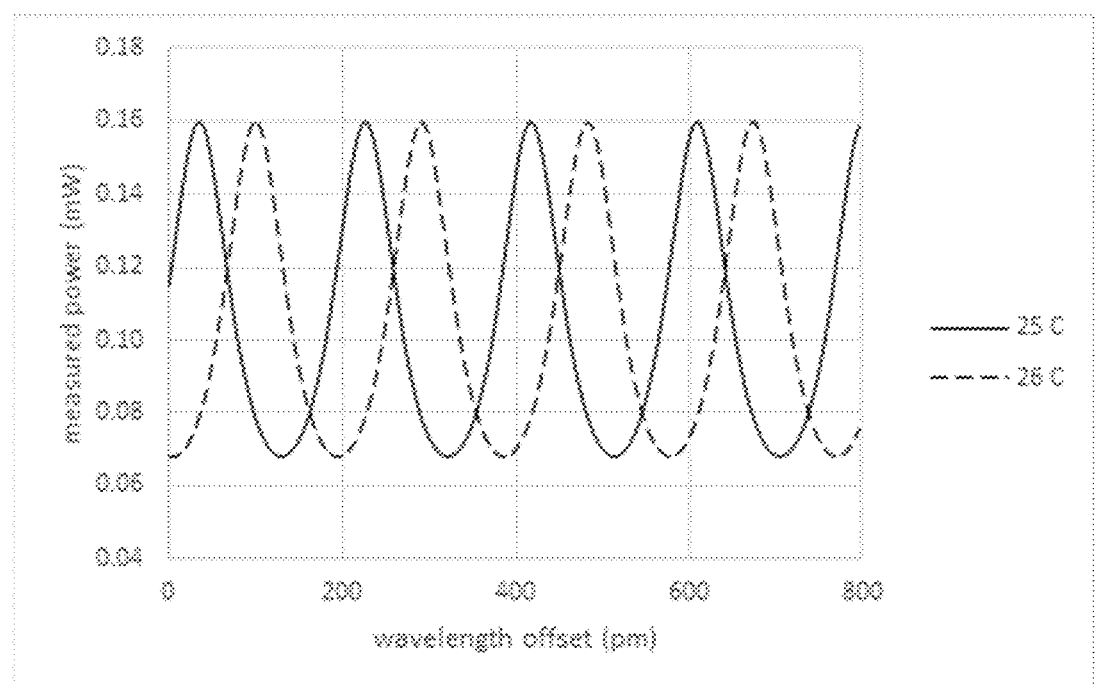
FIG. 1 is an example of a laser wavelength scan through a 2-mm thick solid etalon made from the As$_{40}$Se$_{60}$ composition.

The present disclosure describes athermal glasses and athermal systems for infrared optical components and systems.

The athermal glasses and athermal systems of the present disclosure can be used in many different optical systems that could benefit from the use of a glass or glass system that exhibits minimal dependence of its optical "footprint", normally quantified via its optical path-length (i.e., the product of physical length and refractive index). This disclosure focuses on the five optical components and systems listed below, although the skilled artisan will understand that optical components and systems besides those listed below could similarly benefit from the athermal glass or athermal systems of the current disclosure:

(1) Solid etalon used, for example, as an athermal wavelength reference filter
(2) Optical fiber-based strain sensor
(3) Laser gain media in either bulk or fiber form
(4) Optical fiber such as a photonic crystal fiber
(5) Optical lens system having one or more lenses A solid etalon belongs to a class of optical components called Fabry-Perot interferometers and includes a solid plate of material with highly polished and parallel faces (Koechner, W., Solid-State Laser Engineering, edited by W. T. Rhodes, 6 Ed., 747 pp., Springer, New York, 2006). Parallelism of the faces should be about 30 arc seconds or less. In addition to the solid plate of material, an etalon usually includes one or more coatings on the plate depending on the application. If the primary purpose of the etalon is to provide a phase-sensitive shift within a laser system, anti-reflective coatings (reflectivity (R)< about 0.5%) are typically applied, whereas if the etalon is to serve as a narrow-band, temperature insensitive filter then high-reflective coatings (R> about 95%) are typically applied. In some cases, the inherent reflectivity from uncoated surfaces might be appropriate for the application. Assuming a refractive index about 2.2, this amounts to about 25% total reflection, accounting for both surfaces. Etalons usually include a CTE-matched frame to hold the plate and an opto-mechanical device to precisely align the etalon as per the application needs. In the case of a line-width narrowing optical device as used for a solid-state laser, the etalon is precisely rotated in the beam path so as to "pick out" the desired laser mode(s) (Koechner, 2006). In the case of a wavelength reference filter, used for such things as wavelength calibration, DWDM laser stabilization, and wavelength locking, the etalon is often paired with a fiber coupling apparatus in a transmission mode of use. Temperature stabilization elements can also be employed if required, usually including a temperature sensor (e.g., a thermistor) and a heating element. Conventional wavelength reference filters offer transmission in the visible to near-IR region, while glasses of the current disclosure offer transmission much further into the infrared, up to about 20 microns, consistent with their chalcogenide base composition (e.g., Calvez, L., Chalcogenide glasses and glass-ceramics: Transparent materials in the infrared for dual applications, Comptes Rendus Physique, 18 (5-6), 314-322, 2017).

For a solid etalon, the fractional change in optical pathlength, the product of refractive index (n) and etalon thickness (L), is given by:

$$\frac{1}{nL}\frac{d(nL)}{dT} = \alpha + \frac{1}{n}\frac{dn_{abs}}{dT} \quad (1)$$

where T is temperature, $\alpha$ is the linear thermal expansion, and the subscript "abs" in the dn/dT term refers to the absolute change in index with respect to temperature, and not relative to the surrounding medium.

One common usage of solid etalons is as a wavelength standard through its use as a Fabry-Perot filter via a well-known interference effect. In order for such a filter to be temperature-insensitive in a solid etalon format, the right-hand side (RHS) of Equation (1) must be zero. For solid etalons, there are no known glasses, and there are few, if any, mechanically and chemically robust non-glass materials (such as crystals and polymers) known to satisfy this constraint. One purpose of this disclosure is to provide a series of glasses that can satisfy this constraint and, through a precise selection of glass chemistry, do so at various temperatures, wavelengths, and refractive indices.

An optical fiber-based strain sensor is an optical fiber upon which a photo-inscribed grating has been written, thereby establishing a "fiber Bragg grating" (FBG). A fiber-based strain sensor relies on the attribute that a reflected "Bragg" wavelength changes as the fiber is stretched. This provides for direct strain sensing. In addition to the glass fiber, a fiber-based strain sensor can also include a protective jacket around the fiber, a fiber-coupling device, a broadband optical source to illuminate the fiber, and one or more wavelength-sensitive detectors to monitor the back-reflected "Bragg" light (e.g., Kersey, A. D., M. A. Davis, H. J. Patrick, M. LeBlanc, K. P. Koo, C. G. Askins, M. A. Putnam, and E. J. Friebele, Fiber grating sensors, Journal Of Lightwave Technology, 15 (8), 1442-1462, 1997). Unfortunately, changes in temperature also result in changes in the reflected Bragg wavelength for conventional fiber-based strain sensors. Glasses of the present disclosure would not suffer from this affect owing to their temperature insensitive ("athermal") performance.

The temperature sensitivity of Fiber Bragg Grating (FBG) strain sensors is also precisely described by Eqn. (1) above (Ramakrishnan, M., G. Rajan, Y. Semenova, and G. Farrell, Overview of fiber optic sensor technologies for strain/temperature sensing applications in composite materials, *Sensors* (Switzerland), 16 (1), 2016). This important class of sensors " . . . are the most commonly employed fiber optic sensors in SHM (structural health monitoring) applications for composite materials." (Ramakrishnan et al., 2016). In addition to a desired sensitivity to strain, FBG strain sensors also have an inherent temperature sensitivity owing to both temperature-induced strain (i.e. thermal expansion) as well as the thermo-optic effect dn/dT). The temperature sensitivity of silica fiber-based strain sensors is about 7 ppm/° C. (Kersey et al., 1997), whereas the sensitivity for IRA-15 in the solid etalon (Table 1) is about −0.1 ppm/° C. at 1.5 micron wavelength. Distinguishing changes in sensor signal to either strain or temperature constitutes a source of error for these sensors and an athermal glass, as described herein, would provide a means by which to make a temperature-independent sensing fiber that would retain its strain-sensing capability.

Other optical components and systems require different material constraints to result in temperature insensitivity. A laser gain media such as a laser rod has one or more mirrors to allow for signal build-up within the laser cavity, a material that provides an increase in optical energy within the laser cavity (the gain media), and a pump source to initiate the process of lasing (Koechner, 2006). A laser amplifier is often employed to enhance the brightness of an existing laser beam, typically initiated outside the laser cavity.

For the case of a laser rod in a larger, fixed-length cavity, inevitable heating of the laser rod through normal use leads to changes in refractive index and rod length. In this case, assuming the laser cavity is vacuum, the governing equation is:

$$\frac{1}{L_{rod}}\frac{d(OPL)}{dT} = \alpha(n-1) + \frac{dn_{abs}}{dT} \quad (2)$$

where $L_{rod}$ is the length of the laser rod alone, OPL=total optical path length=$L+L_{rod}$ (n−1), and L is the length of the fixed cavity. The relatively small change to the terms on the RHS of Eqn. (2) as compared with Eqn. (1) alters the material-based constraint to such an extent that there are many non-chalcogenide glasses already known that can satisfy this. An optical lens is a solid piece of optically transparent material (e.g., glass or crystal), with polished flat or curved surfaces, designed to focus or defocus an impinging light beam. A curved surface can take the form of a spherical or a non-spherical form, whereas a flat surface as, for example, in a plano-convex lens, must be flat to within lambda/4 or better, where lambda is a measurement of the wavelength of interest (e.g., 632.8 nm). Adherence to the specified shape must normally be kept to within a tolerance of about 10 microns or better in dimension (Hecht, E., Optics, 4 Ed., 698 pp., Addison Wesley, San Francisco, 2002). Anti-reflective coatings at the operative wavelength of interest are typically used to reduce surface reflectivity. One or more optical lenses can be used to form an imaging system. A CTE-matched metal housing can be employed to hold the various lenses and other optical elements at pre-designated locations along the imaging path. Color and temperature correction of such a system normally requires the use of multiple, compensating materials to arrive at a fully corrected system (e.g., Jamieson, 1981).

For optical lenses, the equation (Hecht, 2002) describing the focal length of a thin lens (f), or its reciprocal, its power (D), in terms of the radii of curvature of its outer surfaces was investigated:

$$\frac{1}{f} = D = \left(\frac{n_q}{n_m} - 1\right)\left(\frac{1}{R_1} - \frac{1}{R_2}\right) \quad (3)$$

where $R_i$ is the radius of curvature of the i'th surface, and $n_g$ and $n_m$ are the refractive indices of the lens (glass in this case) and the surrounding medium, respectively. Taking the derivative of Eqn. (3) with respect to temperature gives Eqn. (7) of Jamieson (1981):

$$\frac{1}{D}\frac{dD}{dT} = \left(\frac{1}{n_g - n_m}\right)\left[\frac{dn_g}{dT} - \frac{n_g}{n_m}\frac{dn_m}{dT}\right] - \alpha \quad (4)$$

In the case of air as the medium, $n_m \approx 1$ and $dn_m/dT \approx -0.93$ ppm/° C. Other authors (Lim, T. Y., and S. C. Park, Achromatic and athermal lens design by redistributing the element powers on an athermal glass map, *Optics Express*, 24 (16), 18049-18058, 2016; Reitmayer, F., and H. Schroeder, Effect of temperature gradients on the wave aberration in athermal optical glasses, *Applied Optics*, 14 (3), 716-720, 1975; Schuster, N., Passive athermalization of doublets in 8-13 micron waveband, *Proceedings of SPIE—The International Society for Optical Engineering*, Vol. 9249, 2014) use a simpler version that neglects the $-(n_g/n_m)(dn_m/dT)$ correction term in Eqn. (4). While such an assumption can be warranted for materials with very large dn/dT's, such as Ge, ZnS, ZnSe, and many chalcogenide glasses, it is not true for most oxide glasses and some chalcogenide glasses (e.g., $As_{40}S_{60}$ with a near-zero dn/dT). For these materials, the correction term is as large as the dn/dT of the material and cannot be neglected. An exception to this is the case in which the surrounding medium is vacuum for which $dn_m/dT$ is precisely zero, leading to a zero correction term for any lens material. Finally, Schwertz et al. (Schwertz, K., D. Dillon, and S. Sparrold, Graphically selecting optical components and housing material for color correction and passive athermalization, Vol. Proc. of SPIE Vol. 8486, p. 84860E, 2012) write their athermalization FOM as the negative of Eqn. (4), calling it β.

Figure 5:
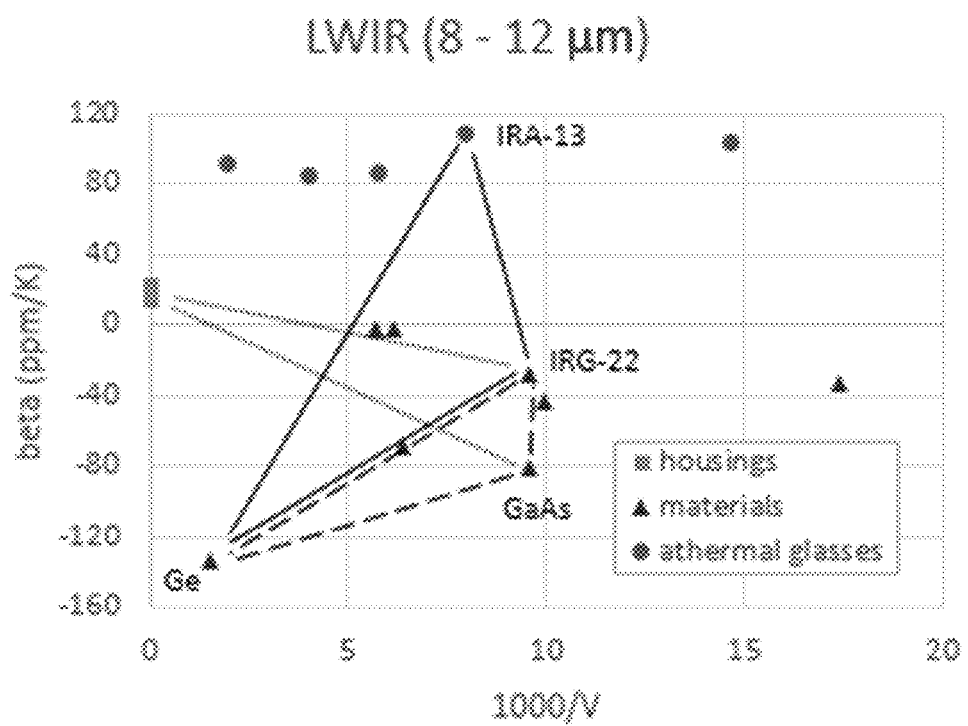
FIG. 5 shows a graphical construction due originally to Tamagawa et al. (Tamagawa, Y., S. Wakabayashi, T. Tajime, and T. Hashimoto, Multilens system design with an athermal chart, Applied Optics, 33 (34), 8009-8013, 1994) in which optical materials are plotted with respect to different attributes.

The current disclosure provides athermal glasses and athermal systems for infrared optical components and systems via either having the FOM's described herein (for example in the case of the solid etalon, optical fiber-based strain sensor, laser gain media and optical fiber), or via supplying a glass or glasses that, when combined with other optical elements, produces an athermal system (for example in the case of the optical lens system). With the optical lens system, the optical lens system can be athermal even though no one component (e.g., a single lens) is athermal; collectively, though, they act as an athermal system (Lim and Park, 2016; Schuster, 2014). This latter approach is often necessary due to the oftentimes-competing requirements of both temperature insensitivity and desired color correction (Lim and Park, 2016). Moreover, glasses of the current disclosure substantially enlarge the range of possible materials with which to design a multi-element lens system, and also do so while decreasing the degree of difficulty of fabricating said elements. FIG. 5 shows a graphical construction due originally to Tamagawa et al. (1994) in which optical materials are plotted with respect to different attributes: the x-axis refers to a specialized form of the refractive index dispersion (see footnote to Table 1 for details) whereas the y-axis corresponds to −FOMlens (Eqn. 4). Shown in this FIG. 5 are a variety of optical materials and relevant metal housings, both taken from Schwertz et al. (2012); additionally, some lenses of the current disclosure are plotted. As an example, to construct an optical lens system having three lenses, one constructs a triangle of maximal area such that a line can be drawn from one apex of the triangle to a desired housing material. Specifically, one such triangle can be drawn using Ge, GaAs, and IRG-22 (dashed lines in FIG. 5). The thin dotted line in FIG. 5 from GaAs to a metal housing completes the construction. However, using a lens of the current disclosure (e.g., IRA-13), in conjunction with IRG-22 and Ge, the resulting triangle (solid lines in FIG. 5) is much larger in area than the former. The implication of this larger area is that optical lens systems having a lens of the current disclosure would require less curvature on their surfaces (Tamagawa et al., 1994) and, hence, would be easier and cheaper to fabricate.

The term "figure(s) of merit" (FOM'(s)) is defined as the right-hand-side (RHS) of equations 1, 2, and 4 above which define material property-based constraints for athermal behavior for the respective optical components. The terms "athermal" or "athermal behavior" and variations thereof mean the FOM has an absolute value that varies by 5 ppm per degree Centigrade or less. In other embodiments, the absolute value varies by 4 or less, 3 or less, 2 or less or 1 ppm per degree Centigrade or less. Since one or more of the lenses of the optical lens system of the disclosure are not required to be athermal, such one or more lens can have a negative FOM≥30 ppm per degree Centigrade. In other embodiments, the negative FOM is ≥40, ≥60, ≥80 or ≥100 ppm per degree Centigrade. An athermal system can be obtained using one or more lenses having one of these FOM's.

Non-limiting examples of glasses that fall within the scope of the current disclosure include glasses that lie in the As—S—Se ternary phase diagram and are conveniently described, on an atomic %, via $$y \text{ As}+(100-y)[x \text{ S}+(100-x)\text{Se}] \quad (5)$$

where 10≤y≤40, and 0≤x≤100. Binary As—S and As—Se glasses also fall within the scope of the current disclosure. While glasses in the As—S—Se system are well known, the necessary detailed property data are typically not available in full. More importantly, the realization that they satisfy the athermal criteria noted above, or can be used as an optical lens in an athermal system, has remained absent.

Figure 4:
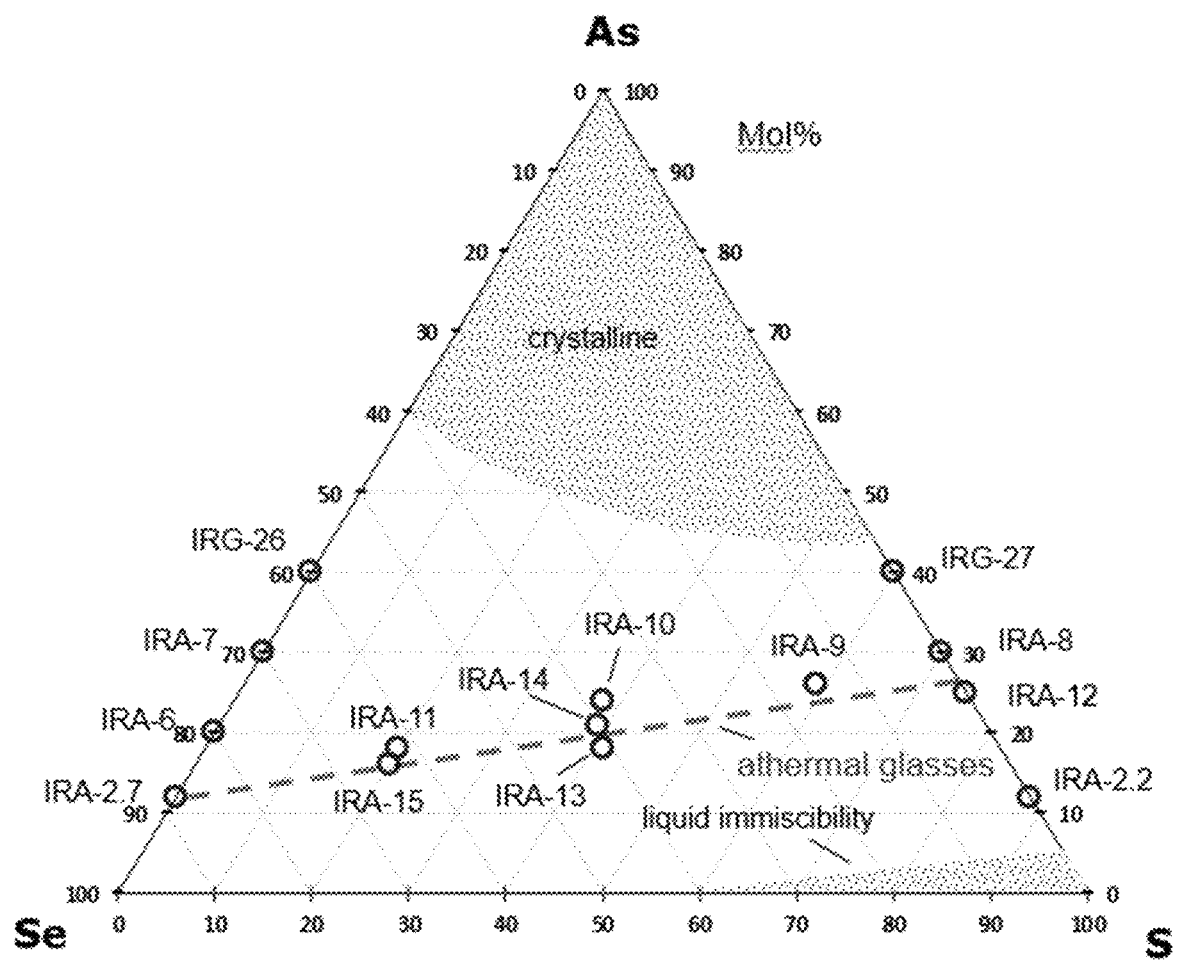
FIG. 4 shows exemplary glasses of the present disclosure in the ternary As—S—Se system.

For the solid etalons and the optical fiber-based strain sensors, in some embodiments the athermal compositions of the disclosure are represented by the formula $(x)As_{11}Se_{89}+(1-x)As_{26}S_{74}$ at a temperature of 25-30° C. and a wavelength of 1.5 microns, where x ranges from 0 to 1 and the tolerance on composition is +/−5 mol % given the behavior as shown in the ternary diagram of FIG. 4 and Table 1. This is represented by the dotted line in FIG. 4 which was added to the As—S—Se ternary diagram from Flaschen et al. (Flaschen, S. S., A. D. Pearson, and W. R. Northover, Low-melting inorganic glasses with high melt fluidities below 400° C., Journal Of The American Ceramic Society, 42 (9), 450-450, 1959).

For the laser gain media, in some embodiments the athermal compositions of the disclosure are represented by the formula $(x)As_{22}Se_{78}+(1-x)As_{33}S_{67}$ at a temperature of 25-30° C. and a wavelength of 1.5 microns, where x ranges from 0 to 1 and the tolerance on composition is +/−5 mol %.

For the optical lens systems described herein, in some embodiments one or more of the lenses of the disclosure are represented by the equation (5), where $10 \le y \le 30$, and $0 \le x \le 100$.

Figure 3A:
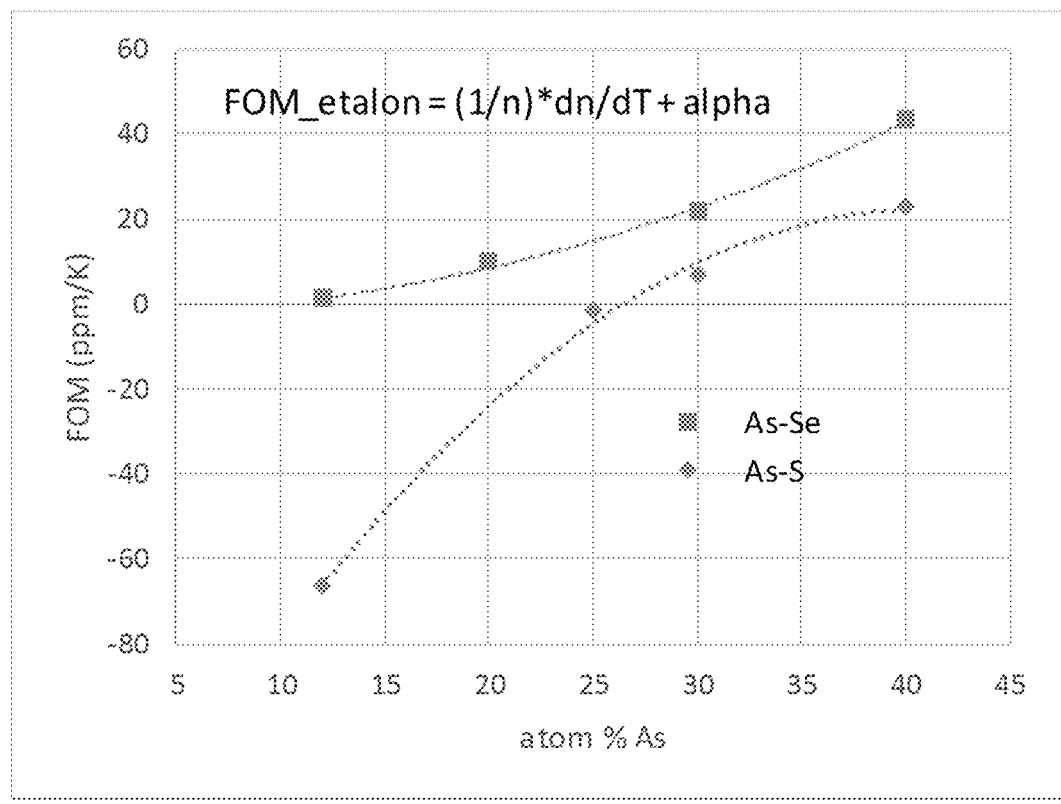
FIG. 3A shows the effect of As on the etalon figure-of-merit (FOM_etalon; Eqn. 1) within the As—Se and As—S binary joins.
Figure 3B:
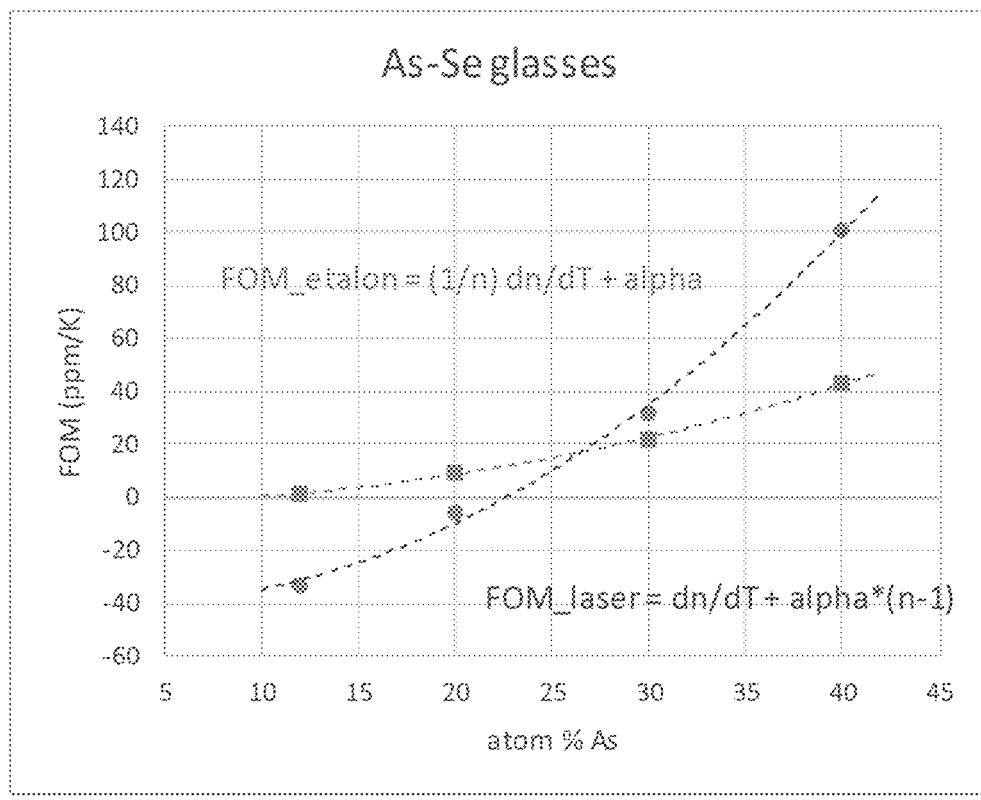
FIG. 3B shows the effect of As for glasses along the As—Se join for the etalon and laser gain media figures-of-merit (Eqns. 1 and 2).

Table 1 summarizes various FOM's in the As—S—Se ternary glass system:

As—Se join, the FOM=0 condition is attained near $As_{11}Se_{89}$ composition, it does so near $As_{26}S_{74}$ for the sulfur glasses. FIG. 3B shows the effect of As for glasses along the As—Se join for the etalon and laser figures-of-merit (Eqns. 1 and 2); here, application choice is decisive, in that $As_{11}Se_{89}$ is the optimal etalon composition but $As_{22}Se_{78}$ is optimal for laser gain media.

A transparent material in a plate-like configuration with suitably parallel planar faces will exhibit interference fringes when scanned with a tunable laser (FIG. 1). The movement of the fringes as the etalon temperature changes can be shown to be precisely equal to the RHS of Eqn. (1), the FOM for a solid etalon.

Figure 2:
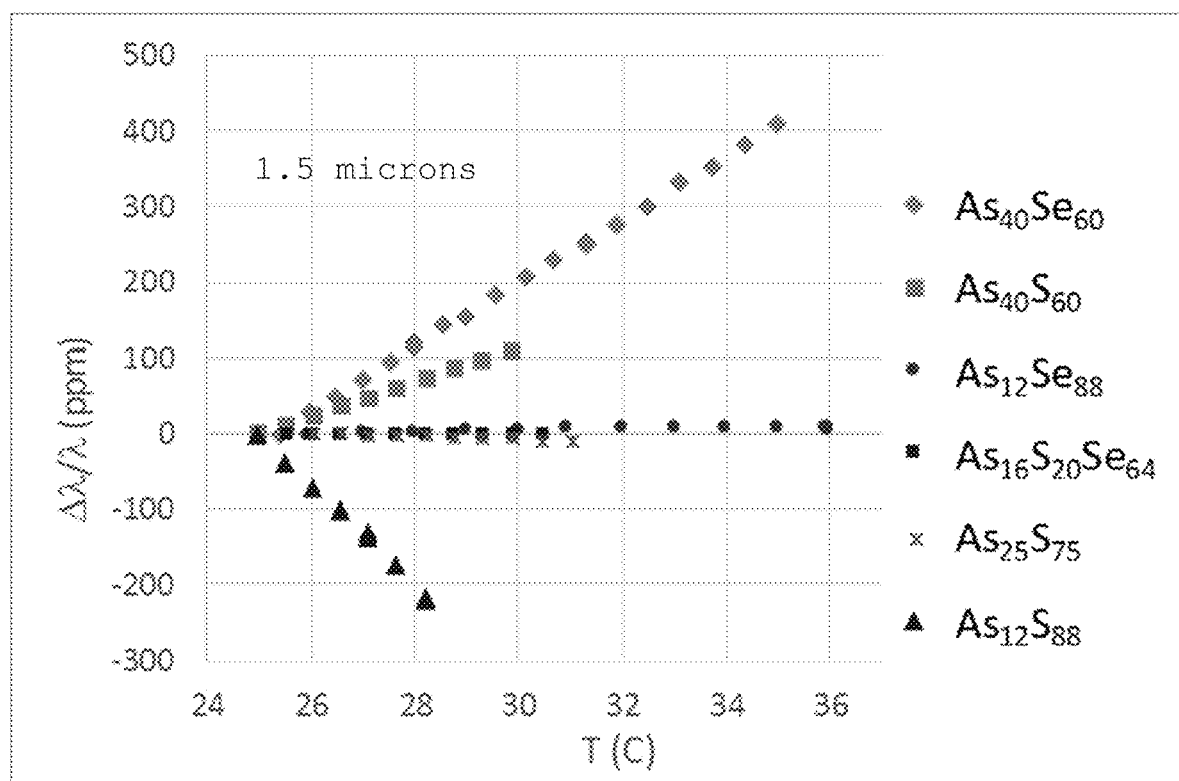
FIG. 2 shows the fractional change in interference fringe position (Eqn. 1) plotted on the y-axis as a function of etalon temperature on the x-axis.

Six different glasses were measured using the aforementioned setup and the results are presented in FIG. 2. Note that, whereas the $As_{40}Se_{60}$ and $As_{12}S_{88}$ compositions exhibit relatively large positive and negative slopes as a function of temperature, respectively, the $As_{12}Se_{88}$, $As_{25}S_{75}$, and $As_{16}S_{20}Se_{64}$ compositions exhibit relatively temperature-independent behavior in the investigated temperature range, manifested by nearly zero fringe movement as the temperature was scanned over 5° C. (i.e. the fringes in FIG. 2

TABLE 1

|  |  | As | S | Se | $T_g$ | n | α | dn/dT_abs | $FOM_{etalon}$ | $FOM_{laser}$ | $-FOM_{lens}$ | 1000/V | |
| --- | --- | --- | --- | --- | --- | --- | --- | --- | --- | --- | --- | --- | --- |
|  |  | atom % | | | ° C. | 1.5 μm | | ppm/° C. | | | | MWIR | LWIR |
| As—Se | IRG 26 | 40 | 0 | 60 | 185 | 2.844 | 20.8 | 62.8 | 42.9 | 101.2 | −14.7 | 5.9 | 6.3 |
|  | IRA 7 | 30 | 0 | 70 | 109 | 2.675 | 26.9 | −13.7 | 21.8 | 31.3 | 33.7 | | |
|  | IRA 6 | 20 | 0 | 80 | 88 | 2.614 | 30.8 | −55.4 | 9.6 | −5.7 | 63.7 | 4.2 | 13.7 |
| As—S | IRA 2.7 | 12 | 0 | 88 | 74 | 2.556 | 35.8 | −88.6 | 1.1 | −32.9 | 91.3 | 4.3 | 2.0 |
|  | IRG 27 | 40 | 60 | 0 | 197 | 2.433 | 22.5 | 0.9 | 22.9 | 33.2 | 20.3 | 6.3 | 21.0 |
|  | IRA 8 | 30 | 70 | 0 | 135 | 2.289 | 32.6 | −59.2 | 6.8 | −17.1 | 76.9 | | |
|  | IRA 2.2 | 12 | 88 | 0 | 30 | 2.073 | 76.0 | −295.5 | −66.5 | −213.9 | 349.6 | 2.3 | 7.0 |
|  | IRA 12 | 25 | 75 | 0 | 117 | 2.233 | 36.2 | −84.8 | −1.8 | −40.2 | 103.4 | 3.8 | 14.7 |
| As—S—Se | IRA 9 | 26 | 59 | 15 | 116 | 2.319 | 33.8 | −69.7 | 8.8 | −25.1 | 85.0 | 4.1 | 4.0 |
|  | IRA 10 | 24 | 38 | 38 | 109 | 2.416 | 32.0 | −61.5 | 6.5 | −16.2 | 73.9 | | |
|  | IRA 11 | 18 | 20 | 62 | 89 | 2.478 | 33.1 | −74.4 | 3.1 | −25.5 | 81.9 | | |
|  | IRA 13 | 18 | 41 | 41 | 84 | 2.376 | 39.4 | −97.7 | −1.7 | −48.4 | 108.8 | 3.7 | 8.0 |
|  | IRA 15 | 16 | 20 | 64 |  | 2.480 | 33.0 | −82.2 | −0.1 | −38.3 | 87.0 | 3.8 | 5.8 |

The following is noted with respect to Table 1. (1) All data in the range of 25-30° C. and at a wavelength of 1.5 μm. Note the measurements for IRG shown here are from the current study and do not necessarily reflect production values. (2) 1000/V refers to refractive index dispersion; MWIR=mid-wave IR (3-5 microns), LWIR=long wave IR (8-12 microns), and where V is defined as (n_mid−n_long)/(n_short−n_long); thus V for LWIR=(n (10)−n (12))/(n(8)−n(12)), where the numbers represent the wavelength in microns. (3) IRG 26 and IRG 27 (in Table 1 for comparison) are existing IR-transparent chalcogenide glasses available from SCHOTT North America.

Table 1 shows that, for the As—Se series of glasses, both the laser cavity and solid etalon systems achieve continuously decreasing FOM's as the Se content increases. Along the As—Se join, the FOM for the laser cavity passes through zero near $As_{22}Se_{78}$, whereas for the etalon FOM it does so at $As_{11}Se_{89}$. The latter composition, in particular, satisfies the difficult-to-achieve FOM=0 condition for a solid etalon, as experimentally confirmed using a tunable laser, a broadband detector, and a means by which to change the temperature of a solid etalon test sample. FIG. 3A shows the effect of As on the etalon figure-of-merit (FOM_etalon; Eqn. 1) within the As—Se and As—S binary joins. Whereas in the exhibited no perceptible movement in wavelength when the temperature was changed). This behavior is entirely consistent with the data presented in Table 1 for these compositions.

Whereas glasses of the current disclosure include the ternary As—S—Se system (FIG. 4), select additions of other Column V elements, notably P, Sb and Bi lead to other athermal compositions, as are additions of Ge and Te, owing to the solubility of all of these elements in chalcogenide glasses.

While the present disclosure has been described with reference to one or more particular embodiments, it will be understood by those skilled in the art that various changes can be made and equivalents can be substituted for elements thereof without departing from the scope thereof. In addition, many modifications can be made to adapt a particular situation or material to the teachings of the disclosure without departing from the scope thereof. Therefore, it is intended that the disclosure not be limited to the particular embodiment(s) disclosed as the best mode contemplated for carrying out this disclosure. The ranges disclosed herein include all subranges therebetween.

What is claimed is:

1. A system, the system comprising:
an etalon or a fiber-based strain sensor, the etalon or the fiber-based strain sensor having a chalcogenide glass composition,
wherein the chalcogenide glass composition is represented by:

$y\text{ As}+(100-y)[x\text{ S}+(100-x)\text{Se}]$ wherein $10 \leq y \leq 40$, and $0 \leq x \leq 100$ in atomic %,
wherein the chalcogenide glass composition has a figure-of-merit (FOM) calculated as:

$$FOM = \alpha + \frac{1}{n}\frac{dn_{abs}}{dT}$$

where $\alpha$ is a linear thermal expansion of the etalon or a fiber-based strain sensor,
T is a temperature,
n is a refractive index, and
$n_{abs}$ is an absolute change in refractive index with respect to the temperature, and wherein $$|FOM| \leq 5\frac{ppm}{°C}.$$

2. The system of claim 1, wherein the chalcogenide glass composition is represented by the formula $(z)As_{11}Se_{89}+(1-z)As_{26}S_{74}$ at a temperature of 25-30° C. and a wavelength of 1.5 microns, where z ranges from 0 to 1, wherein the As, Se, or S can vary by +/−5 mol %.

3. The system of claim 1, wherein $$|FOM| \leq 1\frac{ppm}{°C}.$$

4. The system of claim 1, wherein the system is an etalon.

5. The system of claim 1, wherein the system is a fiber-based strain sensor.

* * * * *